United States Patent [19]
Gardner

[11] 3,964,379
[45] June 22, 1976

[54] MACHINE FOR SLITTING NUT SKINS

[76] Inventor: James W. Gardner, 309 Washington Ave., Tyrone, Pa. 16686

[22] Filed: Jan. 13, 1975

[21] Appl. No.: 540,512

[52] U.S. Cl. .................................. 99/541; 99/589; 99/621; 198/56
[51] Int. Cl.² ....................... B02B 3/08; A23N 5/01
[58] Field of Search ................... 198/53 R, 56, 167; 99/618, 621, 623, 628, 589, 595, 567, 541, 540, 601, 609, 611, 575

[56] References Cited

UNITED STATES PATENTS

| | | | |
|---|---|---|---|
| 684,088 | 8/1901 | Newman | 99/618 |
| 2,500,675 | 3/1950 | Goodwin | 99/575 |
| 2,865,415 | 12/1958 | Pearman | 99/575 |
| 3,217,764 | 11/1965 | Gardner | 99/628 |
| 3,298,414 | 1/1967 | Runnells | 99/589 |

Primary Examiner—Richard E. Aegerter
Assistant Examiner—Steven L. Stephan
Attorney, Agent, or Firm—Morse, Altman, Oates & Bello

[57] ABSTRACT

Edible nuts, such as peanuts, may have their skins slit prior to blanching by means of a machine disclosed herein. The apparatus includes a pair of cooperating rolls which carry a stream of nuts one by one between a pair of cutting elements which slit the nut skin from end to end. The nuts are fed from a vibratory feeding tray which includes a quickly adjustable feed dispenser for controlling the rate of flow according to the size of the nuts being processed. A lever actuated cam controls the flow and the lever position may be aligned with levers of other similar machines arranged in a row in the processing plant. The gap between the rolls which carry the nuts between the cutting elements is also quickly adjustable by means of a lever to accommodate the machine to the size of the nuts being processed. The lever extends outwardly for alignment with levers on similar adjacent machines. A removable waste collection and nut guide chute is also provided for a quick and easy cleaning.

10 Claims, 6 Drawing Figures

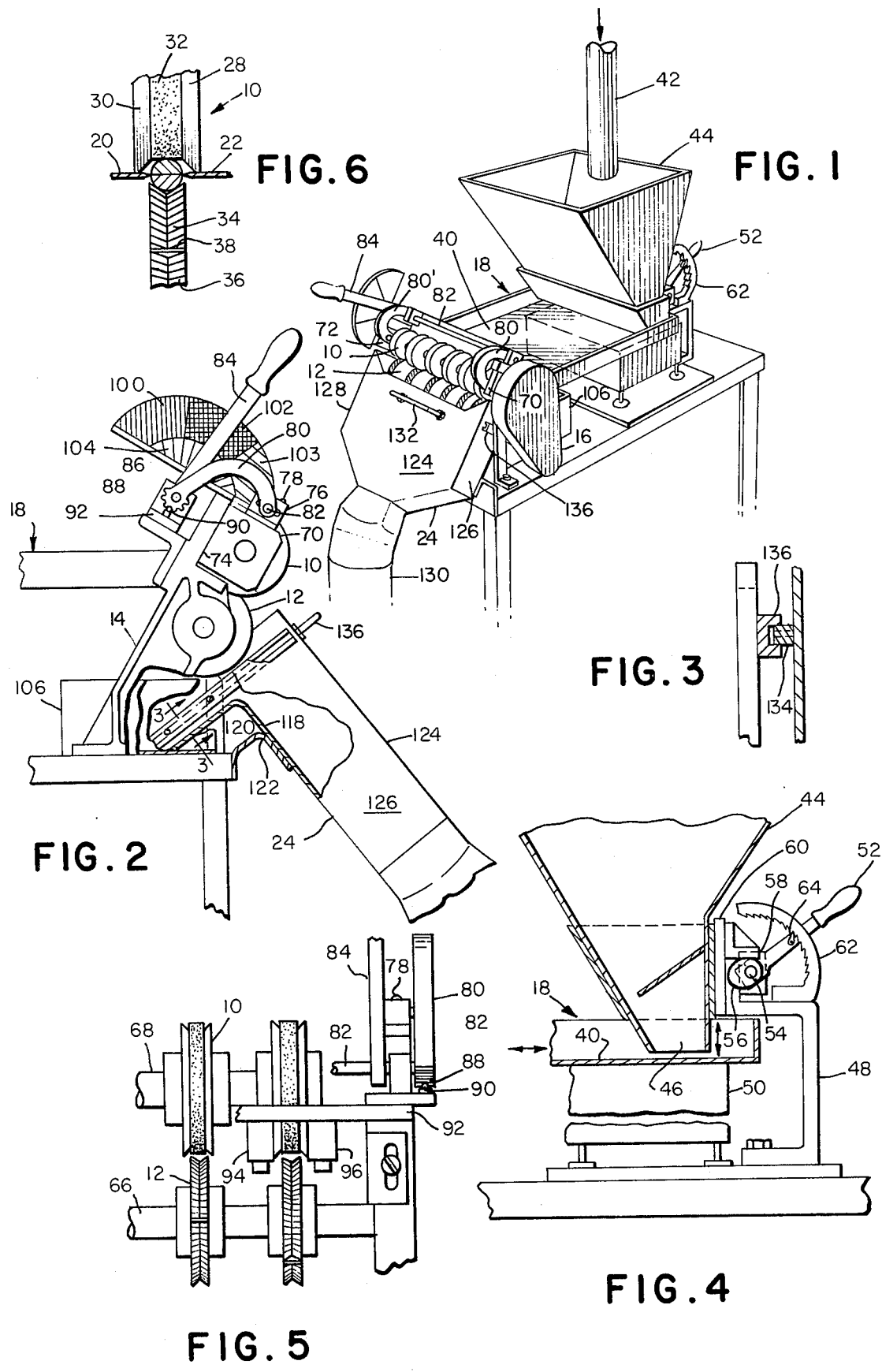
U.S. Patent June 22, 1976 3,964,379

MACHINE FOR SLITTING NUT SKINS

BACKGROUND OF THE INVENTION

1. Field of the Invention

This invention relates generally to apparatus for processing edible nuts and more particularly is directed towards a new and improved apparatus for slitting the skins of edible nuts.

2. Description of the Prior Art

Edible nuts, such as peanuts, grow with an outer hard shell and the nut meat itself is covered wit a tight fitting dark skin. Many consumers find the skin to be objectionable and in the production of many nut products it is the practice to remove the nut skins by various blanching procedures. One such technique is disclosed in my U.S. Pat. No. 3,269,442 and the related equipment is disclosed in my U.S. Pats. 3,196,914 and 3,217,764. This technique involves first passing the nuts through slitting machines which form thin slits in the nut skin from end to end of the nuts, dehydrating the nut to cause the skin to curl back slightly from the nut meat and then feeding the nuts onto a conveyor which is provided with a plurality of spaced abrasive baffles extending diagonally across the upper reach of the conveyor. The nuts are carried diagonally across the belt and forwardly against the baffles effectively removing all of the nut skins with a minimum percentage of broken nuts.

While the foregoing techniques and related apparatus have proven to be satisfactory for their intended purpose, it has now been found that adjustments that must be made to the machines when the average size of the nuts being processed changes is a somewhat tedious and painstaking process. Furthermore, the cleaning of the machinery has also been found to be time consuming because of the need for partial dismantling of the equipment to get at the parts to be cleaned.

Accordingly, it is an object of the present invention to provide improvements in machines for slitting the skins of edible nuts. A more specific object of this invention is to provide a machine for slitting nut skins wherein the machine may be quickly and easily adjusted to accommodate to different sizes of nuts and to insure that all nut slitting machines in a row are adjusted to the same setting corresponding to the nut size being processed. It is another object of this invention to provide a nut skin slitting machine that is quickly and easily cleaned and serviced.

SUMMARY OF THE INVENTION

This invention features a machine for slitting the skins of edible nuts comprising a vibratory feeder tray having a hopper the discharge end of which terminates in closely spaced relation above the tray and mounted for vertical height adjustment by means of a lever actuated cam controlling the flow of nuts according to their average size. Vibration of the tray causes the nuts to be guided into the bite of a pair of co-planar rolls mounted in closely spaced relation and adapted to grab each nut fed from the tray and advance it between a pair of cutting elements positioned on either side of the gap between the rolls, slitting the nut skin as it is pulled through. The rolls are mounted for gap adjustment according to the nut size being processed by means of a lever and crank mechanism by which the upper roll may be raised or lowered by manipulation of the lever. The invention also features a combination delivery chute and waste collection assembly mounted for quick separation from the machine for ease for cleaning.

BRIEF DESCRIPTION OF THE DRAWINGS

FIG. 1 is a view in perspective of a nut skin slitting machine made according to the invention, FIG. 2 is a detailed view in side elevation, partly in section, of the FIG. 1 apparatus, FIG. 3 is a cross-sectional view taken along the line 3—3 of FIG. 2, FIG. 4 is a detailed sectional view in side elevation showing the feed adjustment feature, FIG. 5 is a rear elevation of the skin slitting mechanism, and, FIG. 6 is a detailed view similar to FIG. 4 showing a nut being held by the rolls and simultaneously being slit by the cutting elements.

DETAILED DESCRIPTION OF THE PREFERRED EMBODIMENTS

Referring now to the drawings, the machine for slitting nut skins is generally organized about a pair of rolls 10 and 12 arranged co-planar to one another, one above the other and mounted on a support 14 for rotation about horizontal parallel axes. As best shown in FIG. 2, the upper roll 10 is offset slightly forwardly of the lower roll 12 so as to provide space on the top portion of the roll 12 wherein a shelled nut may be seated. Both rolls are geared together by loosely meshed taper sprocket gears (not shown) with the lower gear being drivingly connected by means of a belt enclosed by a protective housing 16. The rolls 10 and 12 are arranged for rotation in opposite directions as indicated by the arrows in FIG. 2 so that nuts, such as peanuts, fed into the bit of upper rolls by means of a vibratory feeder, indicated by reference character 18, will be gripped by the peripheral edges of the rolls and passed between a pair of cutting elements 20 and 22 as best shown in FIGS. 5 and 6. As the nut is carried between the cutting elements, the skin will be slit from one end to the other along both sides thereof. After the nut is passed out of engagement with the cutting elements it will be discharged down a chute 24 and delivered to the next blanching operation.

In the illustrated embodiment, the upper roll 10 is formed from a pair of annular metal plates 28 having inwardly beveled edges 30 and sandwiching therebetween a resilient annulus 32 of slightly greater diameter than the plates. Preferably, the annulus 32 is fabricated from a sponge rubber or similar resilient material. The lower roll 12 preferably is fabricated with a rigid material such as metal or the like and is of generally the same size as the upper roll 10. However, the lower roll 12 is formed with a Vee groove 34 about its peripheral edge with a plurality of teeth 36 or other frictional elements formed on the face of the groove 34.

Disposed at 180° intervals about the roll 12 are abutments 38 located on the perpheral edge of the roll and spanning the groove 34. The function of the abutments 38 is knock free any nuts which may become lodged between the cutting elements 20 and 22.

As best shown in FIGS. 1 and 4, the nuts are normally delivered from the vibratory feeder 18 onto the upper part of the lower roll 12 by means of a tray 40. As the nuts are delivered to the top of the lower roll 12, they seat in the groove 34 and are then carried forwardly to be gripped by the upper roll 10 which is offset forwardly of the lower roll. It will be understood that by offsetting the upper roll forwardly of the lower roll, the nuts may be properly oriented in a generally longitudinal direction before being gripped for the slitting operation. The Vee groove together with the peripheral teeth provide an excellent seating arrangement for the nuts and cooperate with the resilient upper roll to hold the nut firmly and gently in place while carrying it between the cutter 20 and 22. It should be noted that considerable care should be taken on to provide excessive gripping pressure on the nut since the nut is relatively fragile and splits or disintegrates quite easily.

In the processing of nuts, generally the nuts are pre-sorted according to size so that one batch of nuts may have a different average size than another batch of nuts, with most nuts in one batch being substantially of the same average size. Insofar as the size of the nuts being processed will affect the feed rate, means are provided for quickly adjusting the feed rate of the nuts to make sure that a steady stream of nuts is fed between the rolls and to avoid blockages caused by too fast a feed rate or inefficiency caused by too slow a feed rate.

In FIGS. 1 and 4, the nuts are delivered from a tube 42 into a hopper 44 which temporarily stores a quantity of nuts for delivery onto the tray 40. The lower end of the wedge-shaped hopper 44 is open at 46 and is positioned in slightly spaced relation above the bottom wall of the tray 40. The clearance between the lower end of the hopper and the bottom wall of the tray should be slightly greater than the average size of the nuts being processed. The hopper 44 is mounted by means of a bracket 48 above the tray 40 which is mounted to a vibratory motor 50. The motor 50, it will be understood, when energized will vibrate the tray 40, causing nuts fed thereon to advance into the bite of the rolls 10 and 12 The hopper 46 may be raised or lowered to vary the clearance with the bottom wall of the tray and the lower end of the hopper by means of a lever 52 extending rearwardly from the apparatus. The lever 52 is pivoted at 54 and is provided at its pivot end a cam 56 engaging a shoulder 58 mounted to a slide plate 60 attached to a vertical rear wall of the hopper 44. By moving the lever about its pivot 54, the action of the cam and shoulder will cause the hopper 44 to move up or down, effectively changing the clearance between the hopper opening 46 and the bottom wall of the tray 40. An arcuate rock 62 is mounted to the bracket 48 to engage a spring-loaded pawl 64 by which the lever may be locked to any selected position.

In practice, a nut processing plant will be provided with a large number of skin slitting machines of the sort shown in FIG. 1 so that a large volume of nuts may be processed in the production operation. Typically, the machines shown in FIG. 1 will be arranged in rows, with perhaps ten or twenty machines in each row. All of the machines normally will be processing the same batch of nuts so that each machine should have the same setting according to the size of the nuts. By providing a lever for adjusting the flow of nuts in the manner shown, all of the machines may be set quickly to accommodate the machine to the particular size of the nuts being processed. With the machines lined up in a row one operator may quickly ascertain the setting of all of the machines in that row by merely looking down each row. If all levers are at the same setting, a quick inspection will verify this. Similarly, if one or two levers are not set properly they will not align with other levers in the same row and this will be readily obvious to the operator.

Once the feed rate of the nuts on the tray 40 has been set according to the size of the nuts being processed, the gap between the upper and lower rolls 10 and 12 is similarly adjusted. It will be understood that if the clearance between the rolls 10 and 12 is too small for the nuts being processed, the pressure on the nuts will be excessive resulting in a high percentage of splits or crushed nuts. Likewise, if the clearance is too great, the nuts will not be gripped between the rolls and few nuts will be passed between the slitters 20 and 22.

The lower rolls 12 are mounted in spaced coaxial relation on a common shaft or arbor 66 with a corresponding number of upper rolls 10 mounted on a parallel arbor 68. While the lower arbor 66 is mounted for rotation about a fixed axis the upper arbor 68 may be adjusted to and away from the lower arbor 66 in order to vary the gap between the upper and lower rolls. The arbor 68 is mounted at its ends in bearing blocks 70 and 72. These blocks are slidably engaged as by dovetailing with a cooperating groove formed in the frame 14 along an inclined face 74. Each of the blocks 70 and 72 is provided with a coupling member 76 attached to the upper face of each bearing block. The coupling member 76 connects to the block by means of adjustment screws 78 which allow the coupling members to be individually adjusted for reasons that will presently appear. Each coupling member connects to a crank 80, 80' by means of a pin 82 passing into a slot formed in the coupling member 76. The crank, in turn, at its opposite end is rigidly connected to a shipping rod 82 which connects to cranks 80 and 80'. Also connected to the shipping rod 82 is a lever 84 extending outwardly from the machine. A single lever may be employed or two levers may be utilized, one at each end of the shipping rod to insure that both cranks operate without binding. Alternately, a single lever may be provided at a central position along the shipping rod.

An indexing mechanism generally indicated by reference character 86 is provided at the inner end of each crank 80 and, in the illustrated embodiment, is comprised of a gear sector or indents 88 engaging a spring-loaded detent 90 mounted on a cross plate 92. The cross plate 92 is rigidly mounted at the back side of the frame 14 and serves to support the cutting elements 20 and 22 which are spring-loaded and attached to a pair of depending posts 94 and 96 provided behind each pair of cooperating rolls 10 and 12, as best shown in FIG. 5. It will be understood that the lever may be moved back and forth to any position for raising or lowering the upper rolls according to the gap size required. The indexing mechanism provided by the gear sector and detent will lock the lever as well as the rolls in the desired position.

As a means for determining the gap size quickly according to the average size of the nuts being processed, color-coded dial 98 may be mounted to one or both sides or the apparatus proximate to the lever 84 and, in practice, the dial may be divided into perhaps three segments 100, 102 and 103 colored green, yellow and red, respectively, with red indicating the smaller size nuts and the lowest position of the rolls, yellow indicating medium size nuts and green indicating the largest size nuts and maximum gap position. Smaller incremental segments 104 may also be provided for intermediate settings. In a manner similar to the lever 52 for controlling the rate of flow of nuts, the lever 84 extends out from the machine, although fowardly yet readily visible, so that the gap size setting for all machines in a row may be quickly checked by an operator merely looking down the row and making sure that all of the levers 84 are lined up with one another. Any lever not in the proper position will be out of line and will be readily visible.

While the adjusting mechanism for the upper roll has been illustrated as utilizing a crank and lever, other means may be employed to advantage such as, for example, a rack extending parallel to the slide face 74 of the support with a pinion rotatably mounted to the block 70 and provided with a crank handle operating the pinion and moving the upper rolls to the desired gap position. Similarly, a lever-operated cam such as utilized in the hopper position mechanism as described in FIG. 4 may be used.

In any event, once the setting has been selected, the rolls of all the machines will be set to the same gap position. In order to compensate for any tilting or misalignment of the upper rolls which may occur and to insure perfect parallelism between the arbors 66 and 68, the screw adjust feature provided by the screw 78 allows individual adjustment at each end of the set of upper rolls. Once a parallel condition has been established, normally no further adjustment would be required despite changes of a gap size by lever operation.

When the nuts have been carried between the slitters 20 and 22, the nut skins will have been slit and the nuts will be discharged into the chute 24 where they are then guided down to the blanching machines in which the nut skins are fully removed. The chute 24 of the illustrated embodiment is adapted for quick and easy separation from the slitting machine in order to facilitate cleaning and servicing the machine and its components. In practice, the discharge from the slitting machine will include the whole nuts themselves which will be delivered down the chute as well as a certain amount of waste products such as small bits of nuts, flakes of skin and the like. These waste particles generally collect in a bin 106 disposed below the rolls inwardly thereof and somewhat below the tray 40. The chute assembly 24 is detachably connected to the bin 106 which is rigidly fastened to the slitting machine support and is oriented at an angle as best shown in FIGS. 1 and 2, the chute being provided with a bottom wall 118 having a width corresponding with that of the bin width and extending upwardly to a point below the lower roll 12 where it is formed with a right angle bend 120 which provides a ramp leading down into the bin 106. The function of the ramp is to direct the waste particles from the nuts into the bin while the wall 118 directs the whole nuts down the chute. A stabilizing member 122 is attached to the bottom wall 118 to bear against the front face of the machine support as best shown in FIG. 2. The chute also includes a front wall 124 in spaced parallel relation to the back wall 118 and generally is co-extensive therewith. The front and the back walls are joined by side walls 126 and 128 which are parallel along their sides at the upper portions and converge at their lower portions to connect with a tubular conduit 130. A pull handle 132 is conveniently mounted on the front wall 124 to allow the chute assembly to be separated from the machine. The chute assembly joins with the machine by means of a slide connection shown in FIGS. 1, 2 and 3 and comprised of a rib or rail 134 mounted to the side walls 126 and 128 and slidably engaging a cooperating channel member 136 rigidly connected to the bin 106 and to the supporting frame. With this configuration the entire chute assembly 24 may be easily withdrawn by merely pulling the handle 132 to separate the chute assembly from the machine to allow the interior of the chute to be easily cleaned and facilitating access to the bin and other parts for cleaning and maintenance.

Having thus described the invention, what I claim and desire to obtain by Letters Patent of the United States is:

1. A machine for slitting the skins of edible nuts, comprising
    a. at least a pair of rolls disposed in a vertical plane one above the other and spaced apart from one another to define a nut receiving gap between their peripheries,
    b. slitting means disposed adjacent said gap for engaging nuts passing through said gap,
    c. upper and lower parallel arbors rotatably supporting said rolls,
    d. frame means including bearings supporting opposite ends of said arbors,
    e. parallel guide means on said frame means engaging the ends of at least one of said arbors and extending along parallel paths intersecting the axes of both the upper and lower rolls, and,
    f. adjusting means connected to both ends of said one arbor and to said frame for moving both ends of said one arbor simultaneously along said guide means for selectively changing the size of said gap,
    g. said adjusting means including a crank pivoted to said frame means at each end of said one arbor, each of said cranks connected to the opposite ends of said one arbor,
    h. said cranks being connected to one another for simultaneous movement and lever means connected to said cranks for pivoting said cranks and moving said one arbor along said paths,
    i. said lever means including a handle extending outwardly from machine whereby it may be aligned with the handles of other similar machines arranged in a row.

2. A machine according to claim 1 including indexing means operatively connected to said cranks for locking said cranks in selected angular positions.

3. A machine according to claim 2 wherein said indexing means includes an arcuate array of indents formed about the axis of said crank and a resilient detent mounted to said frame means and engageable with said indents.

4. A machine according to claim 1 including a dial presenting a plurality of color coded sections mounted to said frame means proximate to said lever means to provide a visual indication of the position of said lever means.

5. A machine according to claim 1 including independent adjustable coupling means connecting each end of said one arbor to the associated crank for individual adjustment thereof.

6. A machine according to claim 1 including a vibratory tray mounted in horizontal position adjacent to said gap for delivering nuts into said gap, and an independently supported hopper mounted above said tray for delivering nuts thereon, said hopper including indexed height adjustment means for selectively changing the clearance between the bottom of said hopper and the top of said tray whereby the flow of nuts may be regulated.

7. A machine according to claim 6 wherein said height adjustment means includes a lever pivoted about a fixed axis, a cam drivingly connected to said lever and to said hopper whereby movement of said lever will move said hopper in a vertical plane.

8. A machine according to claim 7 including a fixed arcuate ratchet and a pawl connected to said lever and engaging said ratchet for setting said lever in a locked position.

9. A machine according to claim 1 including a fixed bin mounted below said rolls to collect waste material therefrom and a combination chute and ramp assembly including a tubular chute extending forwardly and downwardly of the machine for guiding nuts discharged from said rolls in one direction and a ramp extending rearwardly and downwardly for guiding waste material from said rolls into said bin.

10. A machine according to claim 9 wherein said assembly includes guide rails extending parallel to said ramp and slightly engaging cooperating grooves formed in said bin.

* * * * *